United States Patent [19]

Sarver

[11] Patent Number: 4,560,245

[45] Date of Patent: Dec. 24, 1985

[54] VEHICULAR WINDSHIELD CURTAIN FOR INHIBITING HEAT TRANSFER

[76] Inventor: Patricia I. Sarver, P.O. Box 6182, Phoenix, Ariz. 85005

[21] Appl. No.: 585,399

[22] Filed: Mar. 2, 1984

[51] Int. Cl.$^4$ ................................................ B60J 3/00
[52] U.S. Cl. ................................ 296/95 C; 296/97 D; 160/DIG. 3; 160/DIG. 7; 160/354
[58] Field of Search ................ 296/95 C, 97 C, 97 D; 160/DIG. 7, DIG. 3, 354; 428/918, 913

[56] References Cited

U.S. PATENT DOCUMENTS

| 2,595,833 | 5/1952 | Flaherty | 296/97 D |
| 4,109,957 | 8/1978 | Polizzi et al. | 296/95 C |
| 4,353,593 | 10/1982 | Henson | 296/97 D |

FOREIGN PATENT DOCUMENTS 2457185  6/1976  Fed. Rep. of Germany .... 296/95 C

*Primary Examiner*—Robert R. Song
*Attorney, Agent, or Firm*—Herbert E. Haynes, Jr.

[57] ABSTRACT

A special heat transfer inhibiting curtain for demountable positioning in juxtaposed coextending relationship with the interior surface of the windshield of a vehicle to reduce interior heat build-up in the vehicle when it is not being operated.

7 Claims, 4 Drawing Figures

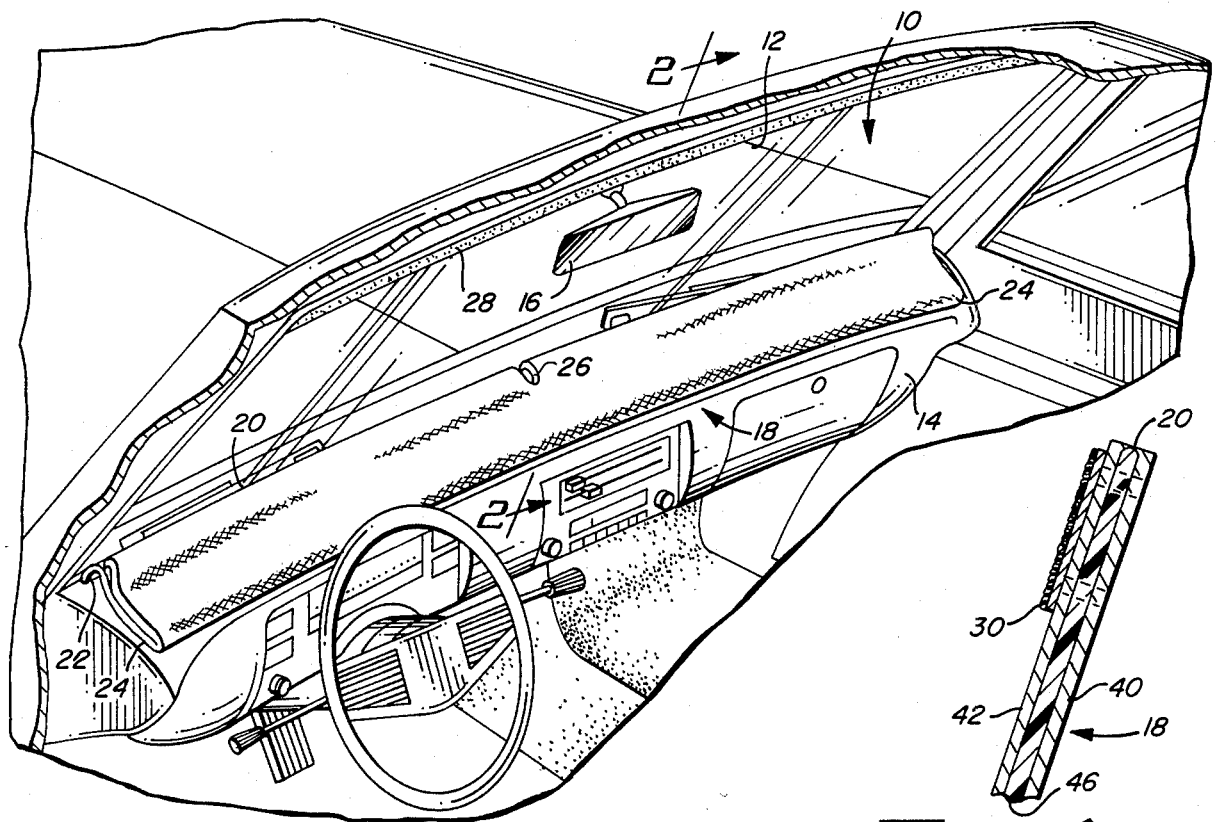
Fig. 1
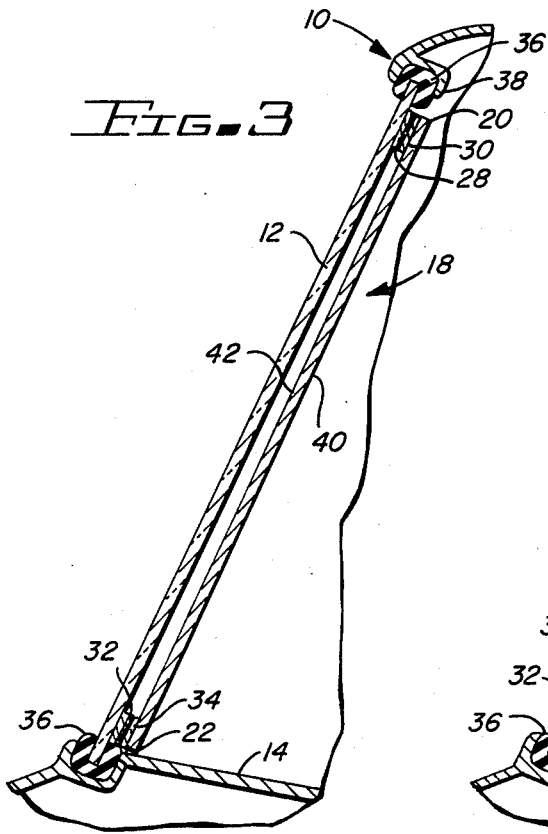
Fig. 3
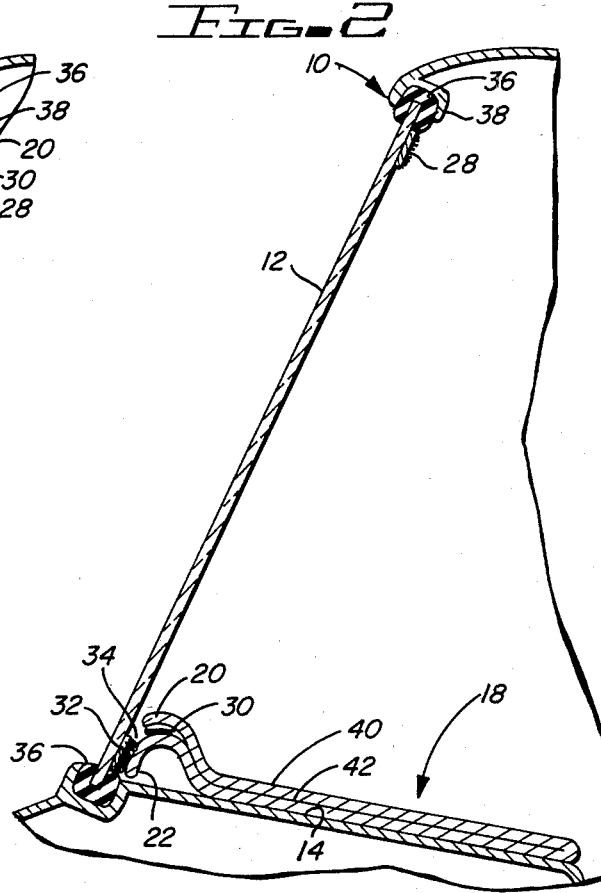
Fig. 2
Fig. 4

VEHICULAR WINDSHIELD CURTAIN FOR INHIBITING HEAT TRANSFER

BACKGROUND OF THE INVENTION

1. Field of the Invention

This invention relates in general to automotive vehicles, and more particularly to a special curtain for demountable attachment to the inside of a vehicle's windshield to inhibit heat transfer therethrough.

2. Description of the Prior Art

As is well known, the heat build-up within a closed automotive vehicle which is parked in the sun, can reach very high temperatures particularly in the warmer areas of the country having intense sunshine. Not only is interior vehicular heat build-up uncomfortable for people who must enter such vehicles, the heat build-up places a very heavy load on vehicular air conditioning equipment, which shortens the life of the equipment and, of course, increases the operating costs. In addition, prolonged exposure to ultra-violet light and the heat itself, can damage, and sometimes destroy the plastic, fabric, and other materials within the vehicle.

Many windshield covers have been suggested and developed for attachment to the outer surface of the windshield to inhibit ice formation thereon, and these covers are often transparent sheets or plastic film. Such covers are, of course, not intended to be used to prevent heat build-up within the vehicle and would be virtually useless if used for that purpose due to their being transparent. Examples of such windshield covers are disclosed in U.S. Patent Nos. 3,140,115, 3,338,293 and 3,874,437.

U.S. Pat. No. 3,266,560 discloses a transparent windshield cover which is for attachment to the inside of the vehicle's windshield. The transparent cover is spaced from the vehicle's windshield for receiving air from the vehicle's heating system, for defrosting and defogging purposes. As above, this inside mounted cover is virtually useless in preventing interior heat build-up due to it being transparent.

A window cover system is disclosed in U.S. Pat. No. 4,209,197, for mounting on the exterior surfaces of all of the windows of the automotive vehicle. The covers of this system are opaque and are intended to be used for preventing ice formations in the winter and heat build-up in the summer. As is the case in all exterior mounted covers, there can be problems with displacement due to wind, the weight of snow, and the like, and further, there are problems with theft when being used and storage when not being used.

The curtain structure of U.S. Pat. No. 4,109,957 is removably mounted on the interior surfaces of vehicular windshields and the two adjacent side windows. The curtain is of an opaque cloth material to provide privacy for the occupants of recreational vehicles, vans, and the like. Due to the fact that the privacy curtain disclosed in this patent is formed of an opaque cloth, it will inherently reduce heat build-up somewhat if used for that purpose. However, since this cover was not intended for use in reducing heat build-up in vehicles, it is less than ideal for that purpose. Cloth materials while being affective in providing privacy are not effective barriers to block solar radiation due to the porosity of cloth. Therefore, if such a curtain were used for reducing heat build-up, it would help, but some solar radiation would still pass through the cloth and it would not do much to prevent heat transfer by conduction. This privacy curtain is designed to be completely removed during operation of the vehicle, and therefore requires storage space, and can be time consuming and cumbersome to repeatedly install.

Therefore, a need exists for a new and improved vehicular windshield curtain for inhibiting heat transfer which overcomes some of the problems and shortcomings of the prior art.

SUMMARY OF THE INVENTION

In accordance with the present invention, a new and improved windshield curtain is disclosed for reducing heat build-up in the interior of automotive vehicles by inhibiting heat transfer through the windshield when the vehicle is not being operated.

A flexible sheet of material having special characteristics is sized and otherwise configured to substantially match the shape of the windshield to which it is to be attached. Suitable fastener means, such as the well known elongated disengageably interlocking fabric strips of the knit loop and hook type, are used for demountably attaching the sheet curtain to the interior surface of the vehicle's windshield. One of the mating fabric strips is affixed to extend along the bottom elongated edge of the windshield, or on the molding thereof, and the other strip is attached to the lower elongated edge of the windshield curtain. Similarly, the mating element of the strip fasteners are provided on the upper elongated edges of the windshield and on the curtain.

The curtain is formed of a flexible sheet of light impervious or black-out material, the outwardly facing surface of which is highly reflective, with the inwardly facing surface being nonreflective. The light impervious characteristics of the curtain completely eliminates interior heat build-up within the vehicle due to radiant heat transfer through the windshield, in that it blocks the sun's rays. The highly reflective outer surface of the windshield curtain will reflect a large percentage of the sun's rays and the accompanying heat. This keeps the windshield curtain relatively cool and thus reduces heat transfer due to conduction in comparison to other materials not having a highly reflective outer surface.

It is intended that when a vehicle that is equipped with the windshield curtain of the present invention is to be operated, that only the upper elongated edge of the curtain be detached to allow it to be lowered into resting engagement on the dashboard of the vehicle in a longitudinally folded-over condition. When lowered in this manner, the non-reflective inner surface of the curtain will be exposed so that the curtain will not create a glare which could hamper the vehicle operator's vision. In addition, this folded-over lowered position of the windshield curtain provides an ideal storage location for the curtain, which substantially reduces the reinstallation hassle, and protects the vehicle's dashboard from the damaging effects of directly impinging ultra-violet light and high temperatures.

Windshield curtains having the above described characteristics can be fabricated in various ways. For example, the light impervious characteristic can be provided by a thin sheet of rubber, silicone, or the like, with this black-out sheet being suitably laminated between suitable exterior and interior sheets or plys. The exterior sheet can be formed in a white, silver, or other highly reflective color, which is suitably deposited on a substrate or provided as an inherent characteristic of the material employed for this purpose. The interior sheet, or ply, can similarly be provided in a suitable relatively dark non-glare, or matte finish. Laminating methods are well known in the art, as is flocking, which can be alternately used to provide either or both of the desirable exterior and interior surface characteristics. The windshield curtain formed by any of the above described techniques will inherently have improved thermal insulative properties in comparison to, for example, the hereinbefore described privacy curtain of U.S. Pat. No. 4,109.957.

Accordingly it is an object of the present invention to provide a new and improved windshield curtain for inhibiting heat build-up within an automotive vehicle.

Another object of the present invention is to provide a new and improved windshield curtain which is for demountable attachment to the interior surface of the windshield to eliminate the displacement problems and reduce the theft problem of some of the prior art structures.

Another object of the pesent invention is to provide a new and improved windshield curtain which is light impervious to eliminate heat build-up within the vehicle resulting from radiant heat transfer through the windshield.

Another object of the present invention is to provide a new and improved windshield curtain of the above described character which has a highly reflective outwardly facing surface to keep the curtain relatively cool and thereby reduce interior heat build-up resulting from conductive heat transfer.

Another object of the present invention is to provide a new and improved windshield curtain of the above described type having a non-reflective inwardly facing surface which allows the curtain to be lowered onto the vehicle's dashboard in a folded-over condition when the vehicle is to be operated to protect the dashboard from the damaging effects of heat and ultra-violet light, and to reduce the storage problem and reinstallation hassle of the prior art structures.

The foregoing and other objects of the present invention, as well as the invention itself, may be fully understood from the following description when read in conjunction with the accompanying drawings.

BRIEF DESCRIPTION OF THE DRAWINGS

FIG. 1 is a fragmentary perspective view of the interior of a typical automotive vehicle that is provided with the windshield curtain of the present invention with the curtain being shown in the lowered position wherein it is resting in a folded-over condition on the dashboard of the vehicle.

FIG. 2 is an enlarged fragmentary sectional view taken along the line 2—2 of FIG. 1.

FIG. 3 is a view similar to FIG. 2 which shows the windshield curtain as being demountably attached on the interior surface of the windshield.

FIG. 4 is an enlarged sectional view of a portion of the windshield curtain which illustrates one way in which the curtain can be fabricated to have the desired heat transfer retarding characteristics.

DESCRIPTION OF THE PREFERRED EMBODIMENT

Referring more particularly to the drawings, FIG. 1 shows a fragmentary view of the interior of a typical automotive vehicle 10 which is provided with the usual windshield 12, dashboard 14, rear view mirror 16, and the like. The vehicle 10 is shown as being provided with the windshield curtain of the present invention which is indicated in its entirety by the reference numeral 18.

The windshield curtain 18, which is fabricated of a material having special characteristics as will hereinafter be described in detail, is sized and otherwise configured to substantially match the shape of the windshield 12. Therefore, the curtain 18 will be of substantially rectangular shape having elongated top and bottom edges 20 and 22, respectively, and opposed side edges 24. In addition, the curtain 18 may be notched as at 26, to provide clearance for the rear view mirror 16 if the vehicle upon which the curtain is to be installed is provided with its mirror mounted in a manner which would otherwise interfere with the installation of the curtain.

Suitable fastener means are provided for demountably attaching the windshield curtain 18 on the interior surface of the windshield 12. The fastener means may be of any suitable type such as suction cups (not shown), snaps (not shown) sewn into the vehicle's headliner, adhesively attached to the windshield molding, or the like. However, it is preferred that the fastener means be in the form of elongated detachably interconnectable fabric strips of the knit loop and hook type. As is well known, fasteners of this type include an elongated fabric strip of knit loops with an elongated mating fabric strip of hooks which demountably interlock with each other when pressed together.

One of the elongated strip fastener elements 28 is attached to the interior surface of the windshield so as to extend along the top edge of the glass with the elongated mating strip fastener element 30 being sewn or otherwise attached to extend along the top edge 20 of the windshield curtain. Another one of the elongated fabric strip fastener elements 32 is attached to the interior surface of the windshield 12 so as to extend along the bottom edge thereof, and the mating strip 34 is attached to extend along the bottom edge 22 of the curtain. It is to be understood that the fastener strips 28 and 32 could be attached to the windshield gasket 36 or the molding 38. However, it has been found that it is easier to install the strips on the glass surface and better results are achieved. Due to the high temperatures involved, the use of special fastener strips that are provided with a high temperature adhesive is recommended.

Such special fastener strips are available from the 3-M Corporation of St. Paul, Minn., 55144, which markets these products under its trademark Scotch Mate. The fabric knit loop element of these fastener strips is identified as part No. 18065, and the hook element as part No. 12749. When obtained in accordance with these product identification numbers, the hook element is provided with an adhesive backing, and in order to obtain an adhesive which will withstand the relatively high temperatures involved, the adhesive product number SJ3536 should be specified in that this specific adhesive will withstand temperatures of up to about 250° F.

With the fastener strip elements 28, 30, 32 and 34 affixed to both the windshield 12 and the curtain 18 as described above, the curtain 18 can be demountably attached in juxtaposed coextending relationship with respect to the interior surface of the windshield 12 as shown in FIG. 3. When so disposed, the curtain 18 will inhibit heat build-up within the vehicle by substantially reducing heat transfer through the windshield. When the vehicle is to be driven, the curtain 18 may be completely removed and stored in some remote area such as in the trunk (not shown) in the case of passenger vehicles. However, complete curtain removal is not necessary, and in most cases, it may be more desirable to lower the curtain 18 onto the vehicle's dashboard 14 as shown in FIGS. 1 and 2. To accomplish the lowering, the top edge 20 of the curtain 18 is pulled away from the windshield 12 which disconnects and separates the fastener strip elements 28 and 30. The curtain 18 is then lowered onto the dashboard and folded longitudinally back on itself to bring the top edge 20 of the curtain 18 to a position proximate the lower portion of the windshield 12 as shown. It will be noted that when the curtain 18 is foldingly stored, it is disposed so that about half of its interior surface 40 is exposed, i.e., faces upwardly, and its exterior surface 42 is substantially hidden due to the folded-over disposition.

The advantages of lowering the curtain 18 onto the vehicle's dashboard 12, as opposed to complete removal, are that in the lowered position, the curtain 18 will protect the dashboard from the deteriorating effects of heat and ultra-violet light, and will significantly facilitate the removal, storage and reinstallation operations.

As hereinbefore mentioned, the curtain 18 is fabricated of a material which has special characteristics, which as will now be described, minimizes heat transfer through the windshield and is otherwise advantageous. Heat build-up within the vehicle as a result of convection, while it may occur at the other windows (not shown) of the vehicle, will be virtually non-existant as a result of heat passing through the windshield, due to the curtain acting as a barrier to air currents. It will be seen that virtually any curtain material could serve to block heat transfer due to conduction, and therefore, the particular material or materials used in fabricating the curtain 18 are selected to minimize heat transfer as a result of radiation and conduction.

In order to eliminate heat build-up within the vehicle as a result of solar radiation through the windshield, the curtain is provided with a thin flexible sheet 46 of material which is impervious to the passage of light, as seen in FIG. 4. The light impervious or black-out sheet 46 may be formed of any suitable non-porous and flexible material, such as rubber, silicone, and the like. In order to reduce the heat transfer through the curtain 18 as a result of conduction, the outer surface 42 of the curtain is highly reflective. This characteristic will, of course, keep the curtain relatively cool and thereby reduce conductive heat transfer therethrough. The highly reflective outer surface 42 of the curtain 18 can be provided by suitably bonding, depositing, or otherwise applying an outer layer, or ply of white, silver, or other light color material to the light impervious sheet 46.

The interior surface 40 of the curtain 18 is non-reflective, or light absorbing, so that the curtain will provide a non-glare surface which would otherwise hamper the vision of the vehicle's operator when in the lowered position. The non-reflective interior surface 40 of the curtain 18 can be provided in the same manner as the highly reflective exteriorly facing surface 42 by suitably bonding, depositing, or otherwise applying an inner layer, or ply, of a dark colored matte finish material to the light impervious sheet 46.

The curtain 18 can be fabricated from commercially available materials having the above described desirable characteristics. A first commercially available material is identified as Roc-Lon thermal suede blackout and is available from the Rockland Company, Inc., of Baltimore, Md., 21203. This Roc-Lon material has the inner light impervious sheet formed of silicon with the outwardly facing surface being white suede fibers which are applied by the well known flocking process. The inner surface is a polyester fabric which is suitably bonded to the inwardly facing surface of the light impervious sheet. While this particular material works quite well for accomplishing the objectives of the present invention, the inwardly facing polyester fabric of this particular material is of a relatively light color. During testing, the relatively light interior surface of this material proved to be less than ideal, in that it did produce some reflective glare. When the inner polyester material was dyed to change it to a dark color, the material worked much better.

In view of the above, it is preferred that a second commercially available material identified as Dana Suede be used to fabricate the curtain 18 of the present invention, in that this second material requires no modifications. This second material is essentially the same as the above described Roc-Lon material, except that its interior surface is of a dark color. The Dana Suede material is identified as product number 024 and is available from the Baker Development Company of 3164 South Country Club Drive, Mesa, Ariz., 85202.

In either case, the thre-ply construction of the materials which are ideally suited for use in fabricating the curtain 18 of the present invention, provides the curtain with some thermal insulative value which enhances the resistance of the curtain to heat transfer due to conduction.

While the principles of the invention have now been made clear in the illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A curtain for inhibiting heat transfer through the windshield into the interior of a vehicle comprising:
   (a) a curtain for demountable placement in juxtaposed coextending relationship with the interior surface of the windshield, said curtain being formed of a flexible and foldable sheet of light impervious material which is configured to substantially match the shape of the windshield and having top and bottom edges;
   (b) cooperating elements of a demountable top edge fastener means on the top edge of said curtain and for affixation proximate the top edge of the windshield for demountably attaching the top edge of said curtain proximate the top edge of the windshield;
   (c) cooperating elements of a bottom edge fastener means on the bottom edge of said curtain and for affixation proximate the bottom edge of the windshield for attaching the bottom edge of said curtain proximate the bottom edge of the windshield; and
   (d) said flexible sheet of light impervious material having light reflecting means on the surface which faces the windshield, and light absorbing means on the surface which faces away from the windshield when the curtain is placed in juxtaposed coextending relationship therewith.

2. A curtain as claimed in claim 1 wherein said cooperating elements of each edge fastener means are demountably interconnectable.

3. A curtain as claimed in claim 2 wherein said cooperating elements of the demountable top and lower edge fastener means comprise a pair of elongated demountably interconnectable fabric strips of the knit loop and hook type.

4. A curtain as claimed in claim 3 wherein one of each of said pair of elongated demountably interconnectable fabric strips has a high temperature resistant adhesive on the surface thereof by which it is affixable to the windshield.

5. A curtain for use in a vehicle comprising:
(a) a curtain mountable in the vehicle proximate the windshield thereof for selective movement between a first position in folded-over resting engagement on the dashboard of the vehicle to a second position in juxtaposed coextensive relationship with the interior surface of the windshield, said curtain being configured to substantially match the shape of the windshield and having top and bottom edges, said curtain being formed of a flexible and foldable light impervious material to inhibit heat transfer through the windshield into the vehicle when said curtain is in the second position;
(b) cooperating elements of a demountable top edge fastener means on the top edge of said curtain and for affixation proximate the top edge of the windshield for demountably holding said curtain in the second position; and
(c) cooperating elements of a bottom edge fastener means on the bottom edge of said curtain and for affixation proximate the bottom edge of the windshield for attaching the bottom edge of said curtain to the bottom edge of the windshield; and
(d) said curtain having light reflecting means on the surface of said curtain facing the windshield and light absorbing means on the surface of said curtain facing away from the windshield where said curtain is in the second position.

6. A curtain as claimed in claim 5 wherein said cooperating elements of each demountable edge fastener means comprise a pair of elongated demountably interconnectable fabric strips of the knit loop and hook type.

7. A curtain as claimed in claim 6 wherein one of each of said pair of demountably interconnectable fabric strips has a high temperature resistant adhesive on one surface thereof by which it is affixable on the windshield.

* * * * *